United States Patent
Boesen et al.

(10) Patent No.: US 10,681,449 B2
(45) Date of Patent: *Jun. 9, 2020

(54) EARPIECE WITH ADDED AMBIENT ENVIRONMENT

(71) Applicant: BRAGI GmbH, München (DE)

(72) Inventors: Peter Vincent Boesen, München (DE); Darko Dragicevic, München (DE)

(73) Assignee: BRAGI GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,827

(22) Filed: Jul. 25, 2018

(65) Prior Publication Data

US 2018/0332381 A1 Nov. 15, 2018

Related U.S. Application Data

(63) Continuation of application No. 15/804,107, filed on Nov. 6, 2017, now Pat. No. 10,045,112.

(60) Provisional application No. 62/417,374, filed on Nov. 4, 2016.

(51) Int. Cl.
| | |
|---|---|
| *H04R 29/00* | (2006.01) |
| *H04R 1/10* | (2006.01) |
| *G06F 3/01* | (2006.01) |
| *H04S 7/00* | (2006.01) |

(52) U.S. Cl.
CPC ......... *H04R 1/1041* (2013.01); *G06F 3/017* (2013.01); *H04R 1/1016* (2013.01); *H04R 1/1083* (2013.01); *H04R 1/1091* (2013.01); *H04R 29/001* (2013.01); *H04S 7/304* (2013.01); *H04R 2420/07* (2013.01); *H04R 2460/13* (2013.01)

(58) Field of Classification Search
CPC .................................................. H04R 29/00
See application file for complete search history.

(56) References Cited

U.S. PATENT DOCUMENTS

| | | | |
|---|---|---|---|
| 2,325,590 | A | 8/1943 | Carlisle et al. |
| 2,430,229 | A | 11/1947 | Kelsey |
| 3,047,089 | A | 7/1962 | Zwislocki |
| (Continued) | | | |

FOREIGN PATENT DOCUMENTS

| | | |
|---|---|---|
| CN | 204244472 U | 4/2015 |
| CN | 104683519 A | 6/2015 |
| (Continued) | | |

OTHER PUBLICATIONS

Stretchgoal—The Carrying Case for the Dash (Feb. 12, 2014).

(Continued)

*Primary Examiner* — Olisa Anwah

(74) *Attorney, Agent, or Firm* — Goodhue, Coleman & Owens, P.C.

(57) ABSTRACT

An earpiece includes an earpiece housing, wherein the earpiece housing is configured to substantially encompass an opening of an ear canal to physically block ambient sound from entering the ear canal. The earpiece further includes a processor disposed within the earpiece housing, at least one microphone operatively connected to the processor and configured to sense ambient sound, and a speaker operatively connected to the processor. The processor is configured to process the ambient sound from the microphone and add additional ambient sound to produce a modified ambient sound at the speaker.

8 Claims, 5 Drawing Sheets

(56) References Cited

U.S. PATENT DOCUMENTS

| | | |
|---|---|---|
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| 8,238,967 B1 | 8/2012 | Arnold et al. |
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,317,241 B2 | 4/2016 | Tranchina |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| 9,524,631 B1 | 12/2016 | Agrawal et al. |
| D777,710 S | 1/2017 | Palmborg et al. |
| 9,544,689 B2 | 1/2017 | Fisher et al. |
| D788,079 S | 5/2017 | Son et al. |
| 9,684,778 B2 | 6/2017 | Tharappel et al. |
| 9,711,062 B2 | 7/2017 | Ellis et al. |
| 9,729,979 B2 | 8/2017 | Özden |
| 9,767,709 B2 | 9/2017 | Ellis |
| 9,821,767 B2 | 11/2017 | Nixon |
| 9,848,257 B2 | 12/2017 | Ambrose et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |

(56) References Cited

U.S. PATENT DOCUMENTS

| | | |
|---|---|---|
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0247800 A1 | 10/2007 | Smith et al. |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0041313 A1 | 2/2009 | Brown |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0182913 A1 | 7/2009 | Rosenblatt et al. |
| 2009/0191920 A1 | 7/2009 | Regen et al. |
| 2009/0226017 A1 | 9/2009 | Abolfathi et al. |
| 2009/0240947 A1 | 9/2009 | Goyal et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0007805 A1 | 1/2010 | Vitito |
| 2010/0033313 A1 | 2/2010 | Keady et al. |
| 2010/0075631 A1 | 3/2010 | Black et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Arie et al. |
| 2012/0057740 A1 | 3/2012 | Rosal |
| 2012/0155670 A1 | 6/2012 | Rutschman |
| 2012/0159617 A1 | 6/2012 | Wu et al. |
| 2012/0162891 A1 | 6/2012 | Tranchina et al. |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0200999 A1 | 8/2013 | Spodak et al. |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0002357 A1 | 1/2014 | Pombo et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0237518 A1 | 8/2014 | Liu |
| 2014/0270227 A1 | 9/2014 | Swanson |
| 2014/0270271 A1 | 9/2014 | Dehe et al. |
| 2014/0276227 A1 | 9/2014 | Pérez |
| 2014/0279889 A1 | 9/2014 | Luna |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0124058 A1 | 5/2015 | Okpeva et al. |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1* | 12/2015 | Kraft .............. H04R 1/1083 381/17 |
| 2015/0379251 A1 | 12/2015 | Komaki |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0094550 A1 | 3/2016 | Bradley et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |

(56) References Cited

U.S. PATENT DOCUMENTS

| | | |
|---|---|---|
| 2016/0142818 A1 | 5/2016 | Park |
| 2016/0162259 A1 | 6/2016 | Zhao et al. |
| 2016/0209691 A1 | 7/2016 | Yang et al. |
| 2016/0226713 A1 | 8/2016 | Dellinger et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert et al. |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0096065 A1 | 4/2017 | Katsuno et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251295 A1 | 8/2017 | Pergament et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0297430 A1 | 10/2017 | Hori et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |
| 2018/0056903 A1 | 3/2018 | Mullett |
| 2018/0063626 A1 | 3/2018 | Pong et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Stretchgoal—Windows Phone Support (Feb. 17, 2014).
The Dash + The Charging Case & The BRAGI News (Feb. 21, 2014).
The Dash-A Word From Our Software, Mechanical and Acoustics Team + An Update (Mar. 11, 2014).
Update From BRAGI—$3,000,000—Yipee (Mar. 22, 2014).
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.

(56) References Cited

OTHER PUBLICATIONS

Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected-The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, On Track(May 16, 2015).
BRAGI Update—Beta2 Production and Factory Line(Aug. 20, 2015).
BRAGI Update—Certifications, Production, Ramping Up (Nov. 13, 2015).
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview (Jun. 24, 2015).
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces A Health + Mobility Concept for Wellness in Mobility", Fountain Valley, California (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before The Kickstarter Campaign Ends on Monday 4pm CET (Mar. 28, 2014).
Lovejoy: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XP055317584, YU.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biotmetrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014).

\* cited by examiner

EARPIECE WITH ADDED AMBIENT ENVIRONMENT

PRIORITY STATEMENT

This application is a continuation of U.S. patent application Ser. No. 15/804,107 filed on Nov. 6, 2017 which claims priority to U.S. Provisional Patent Application No. 62/417,374 filed on Nov. 4, 2016 all of which are titled Earpiece with Added Ambient Environment and all of which are hereby incorporated by reference in their entirety.

FIELD OF THE INVENTION

The present invention relates to wearable devices. More particularly, but not exclusively, the present invention relates to earpieces.

BACKGROUND

In certain instances, users may wish to listen to ambient sounds instead of filtering them out when wearing an earpiece. However, the user may want to listen to an ambient sound not present in the user's current environment. Thus, a system and method are needed allowing a user to incorporate ambient sounds not present in the user's environment with other ambient sounds while wearing the earpieces.

SUMMARY

Therefore, it is a primary object, feature, or advantage of the present invention to improve over the state of the art.

It is a further object, feature, or advantage of the present invention to allow a user to add an additional ambient sound to other ambient sounds to listen to.

It is a still further object, feature, or advantage of the present invention to simultaneously improve audio transparency and allow a user to add an ambient sound which may not be present in the user's environment.

According to one aspect, an earpiece includes an earpiece housing, wherein the earpiece housing is configured to substantially encompass an opening of an ear canal to physically block ambient sound from entering the ear canal. The earpiece further includes a processor disposed within the earpiece housing, at least one microphone operatively connected to the processor and configured to sense ambient sound, and a speaker operatively connected to the processor. The processor is configured to process the ambient sound from the microphone and add additional ambient sound to produce a modified ambient sound at the speaker. The earpiece may further include a wireless transceiver disposed within the earpiece housing and operatively connected to the processor. The earpiece may further include data storage disposed within the earpiece housing and operative connected to the processor and wherein a representation of the additional ambient sound is stored within the data storage. The earpiece may further include a gestural interface operative connected to the processor and wherein the processor is configured to receive a selection of the additional ambient sound through the gestural interface. The earpiece may further include an inertial sensor disposed within the earpiece housing and operative connected to the processor.

According to another aspect, a method of adding an ambient environment to sound reproduced at an earpiece is provided. The method may include receiving ambient environment sound at a microphone of the earpiece, processing the ambient environment sound at a processor of the earpiece to add one or more additional ambient sounds to the ambient environment sound to produce a modified ambient environment sound, communicating the modified ambient environment sound from the processor of the earpiece to a speaker of the earpiece, and producing the modified ambient environment sound at the speaker of the earpiece. The method may further include receiving a selection of the one or more additional ambient sounds at the earpiece. This receiving step may be performed using a gestural interface of the earpiece.

In one embodiment, a system includes an earpiece having an earpiece housing, wherein the earpiece housing is configured to substantially encompass an opening of an ear canal, a processor disposed within the earpiece housing, at least one microphone operatively connected to the processor and configured to sense ambient sound, and a speaker operatively connected to the earpiece housing and operatively connected to the processor, wherein the processor is configured to process the ambient sound from the microphone and add additional ambient sound to produce a modified ambient sound at the speaker.

One or more of the following features may be included. The earpiece may comprise a set of earpieces. The set of earpieces may comprise a left earpiece and a right earpiece. The earpiece housing may be composed of soundproof materials. The earpiece housing may be further configured to substantially fit within an ear canal. The earpiece housing may also have a sheath attached to a side proximate to the ear canal. One or more microphones may be configured to receive voice commands. A bone conduction microphone may be positioned to receive voice commands or other voice input from the user. A gesture control interface may be operatively connected to the earpiece housing and operatively connected to the processor. The gesture control interface may be configured to serve as a user interface.

DETAILED DESCRIPTION

Figure 1:
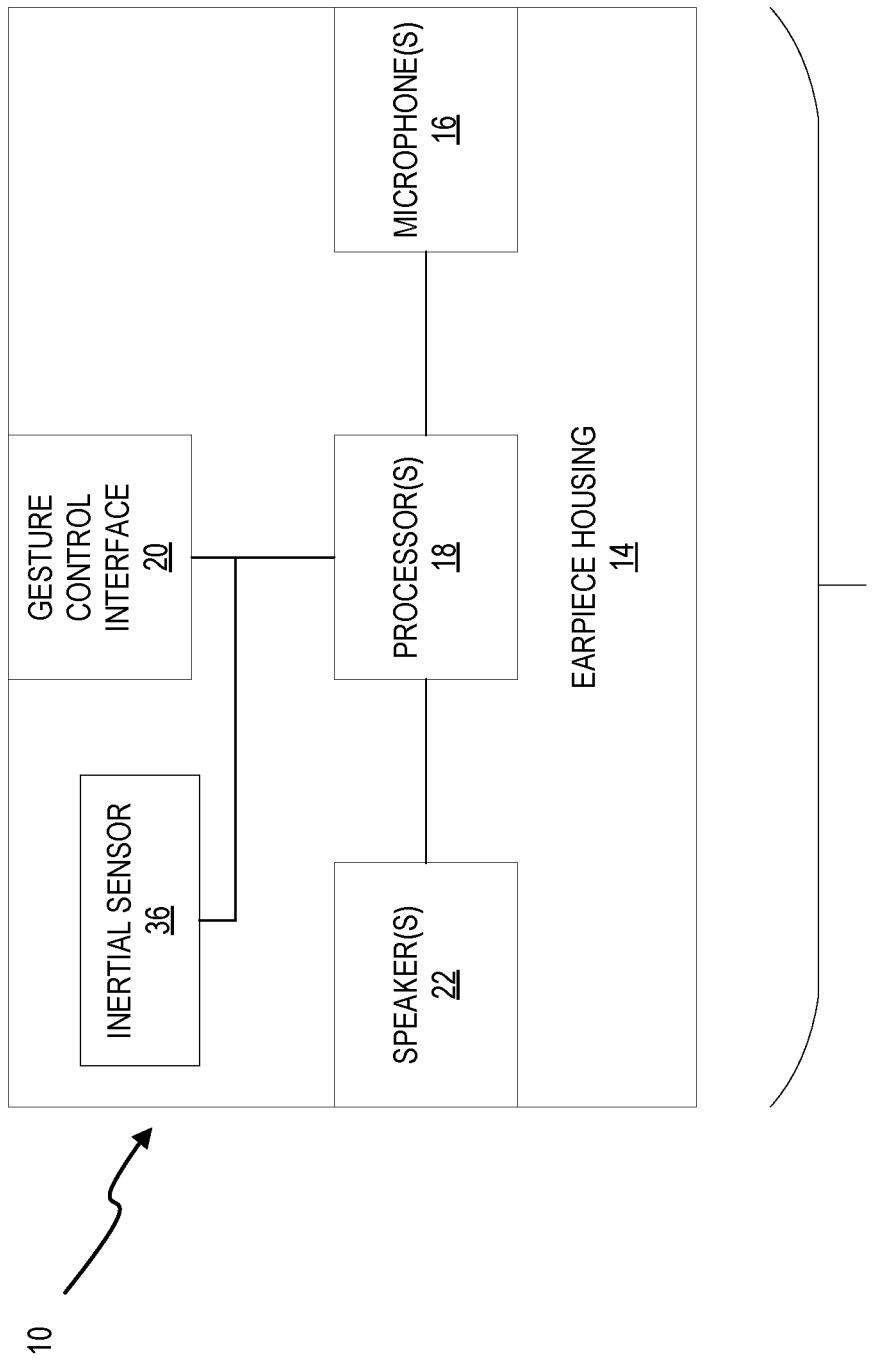
FIG. 1 includes a block diagram of one embodiment of the system

FIG. 1 illustrates a block diagram of the system 10 having at least one earpiece 12 having an earpiece housing 14. A microphone 16 is positioned to receive ambient sound. One or more processors 18 may be disposed within the earpiece housing 14 and operatively connected to microphone 16. A gesture control interface 20 is operatively connected to the processor 18. The gesture control interface 20 configured to allow a user to control the processing of the ambient sounds such as by selecting a source of ambient sounds which the user wishes to listen to. An inertial sensor 36 is also shown which is operatively connected to the one or more processors. One or more speakers 22 may be positioned within the earpiece housing 14 and configured to communicate the ambient sounds desired by the user. The earpiece housing 14 may be composed of soundproof materials to improve audio transparency or any material resistant to shear and strain and may also have a sheath attached in order to improve comfort, sound transmission or reduce the likelihood of skin or ear allergies. In addition, the earpiece housing 14 may also substantially encompass the external auditory canal of the user in order to substantially reduce or eliminate external sounds to further improve audio transparency.

One or more microphones 16 may be positioned to receive one or more ambient sounds. The ambient sounds may originate from the user, a third party, a machine, an animal, another earpiece, another electronic device or even nature itself. The types of ambient sounds received by the microphones 16 may include words, combination of words, sounds, combinations of sounds or any combination of the aforementioned. The ambient sounds may be of any frequency and need not necessarily be audible to the user.

The processor 18 is the logic controls for the operation and functionality of the earpiece(s) 12. The processor 18 may include circuitry, chips, and other digital logic. The processor 18 may also include programs, scripts and instructions, which may be implemented to operate the processor 18. The processor 18 may represent hardware, software, firmware or any combination thereof. In one embodiment, the processor 18 may include one or more processors including one or more digital signal processors. The processor 18 may also represent an application specific integrated circuit (ASIC), system-on-a-chip (SOC) or field programmable gate array (FPGA).

The processor 18 may also process gestures to determine commands or selections implemented by the earpiece 12. Gestures such as taps, double taps, triple taps, swipes, or holds. The processor 18 may also process movements by the inertial sensor 36. The inertial sensor 36 may be a 9-axis inertial sensor which may include a 3-axis accelerometer, 3-axis gyroscope, and 3-axis magnetometer. The inertial sensor 36 may serve as a user interface. For example, a user may move their head and the inertial sensor may detect the head movements. The processor 18 may also provide for processing voice of a user in order in order to determine voice commands of the user.

In one embodiment, the processor 18 is circuitry or logic enabled to control execution of a set of instructions. The processor 18 may be one or more microprocessors, digital signal processors, application-specific integrated circuits (ASIC), central processing units or other devices suitable for controlling an electronic device including one or more hardware and software elements, executing software, instructions, programs, and applications, converting and processing signals and information and performing other related tasks. The processor may be a single chip or integrated with other computing or communications components.

Figure 2:
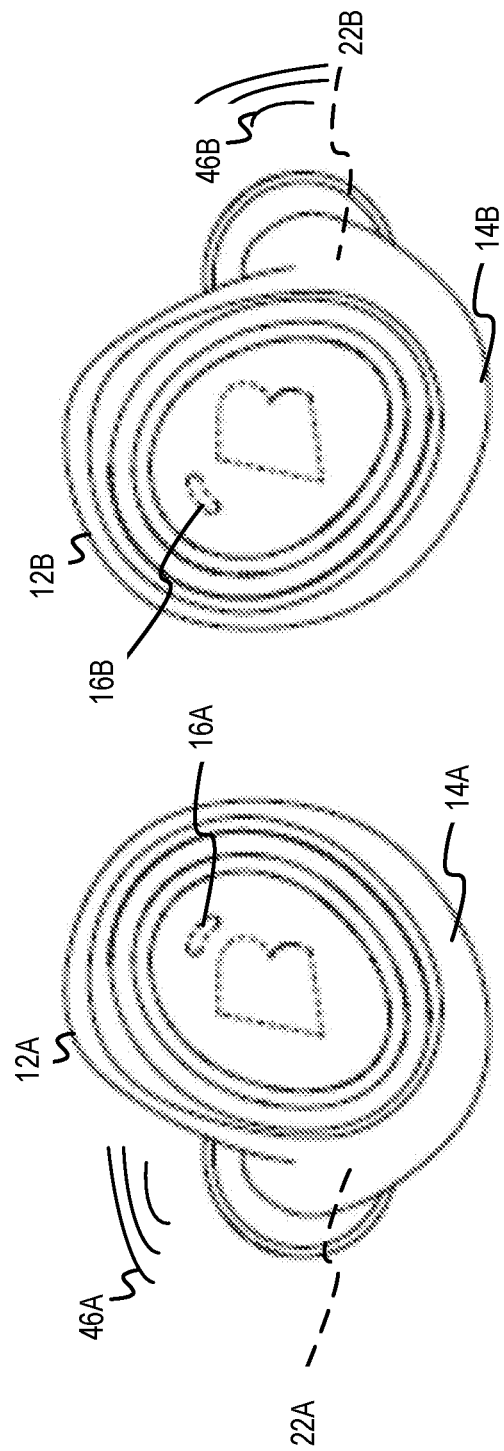
FIG. 2 illustrates a system including a left earpiece and a right earpiece.
Figure 3:
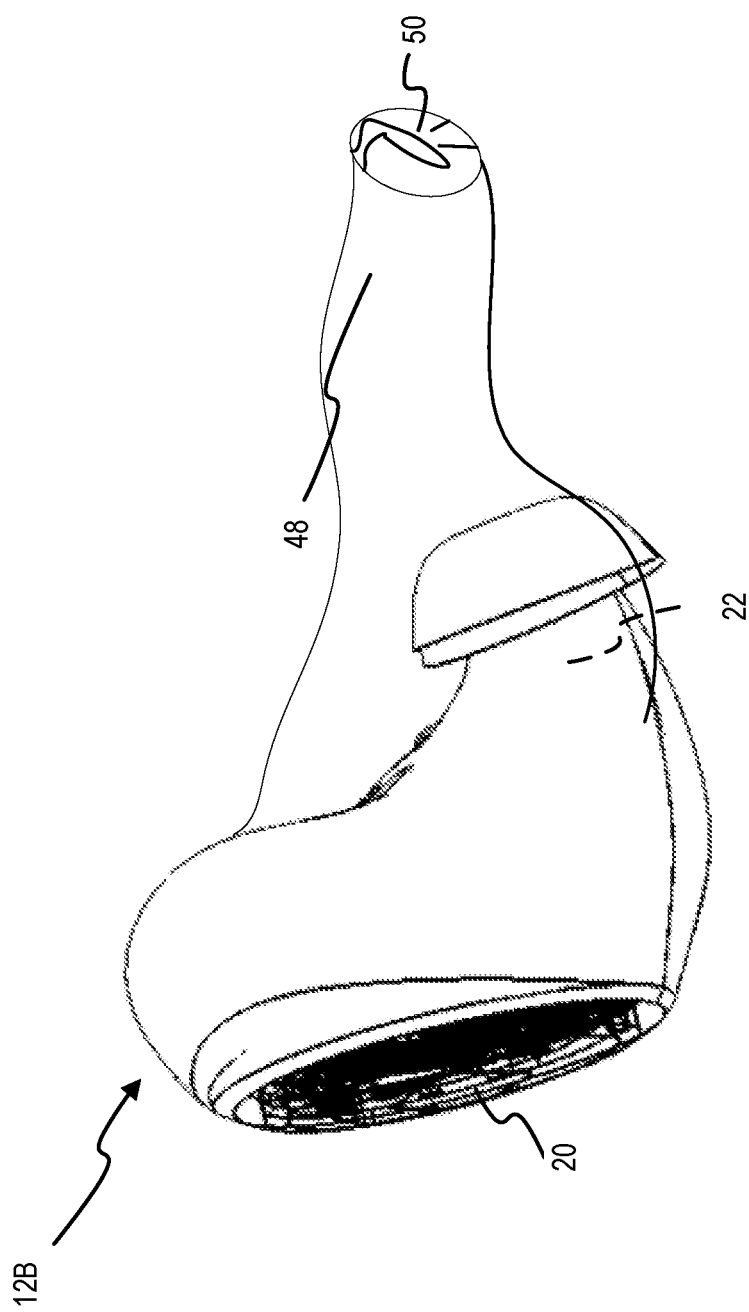
FIG. 3 illustrates a right earpiece and its relationship to an ear.
Figure 4:
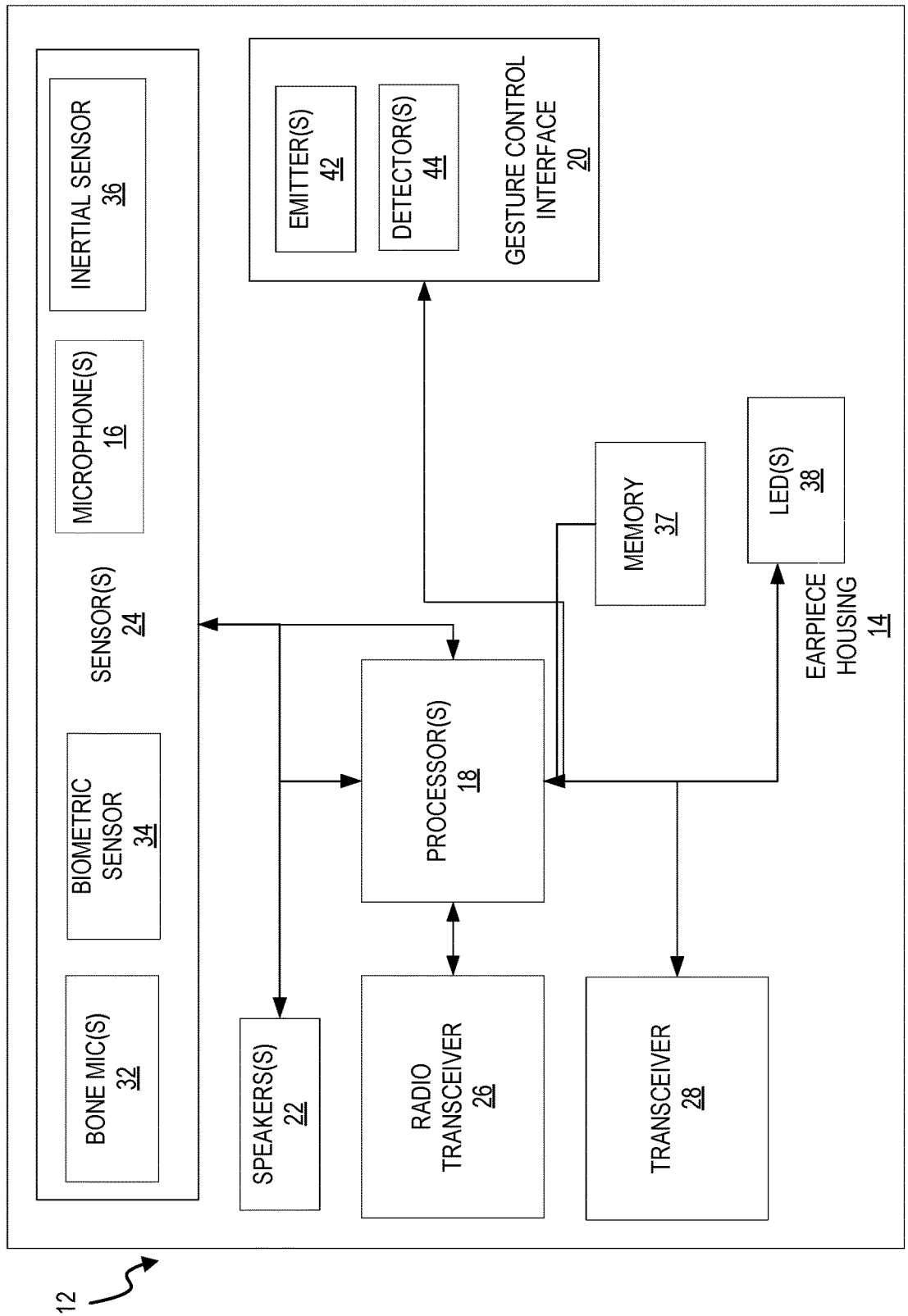
FIG. 4 includes a block diagram of a second embodiment of the system.

A gesture control interface 20 is mounted onto the earpiece housing 14 and operatively connected to the processor 18 and configured to allow a user to select one or more environmental sounds to add or to otherwise select settings associated with the one or more environmental sounds. The gesture control interface 20 may be located anywhere on the earpiece housing 14 conducive to receiving a gesture and may be configured to receive tapping gestures, swiping gestures, or gestures which do not make contact with either the gesture control interface 20 or another part of the earpiece 12. FIG. 2 illustrates a pair of earpieces which includes a left earpiece 12A and a right earpiece 12B. The left earpiece 12A has a left earpiece housing 14A. The right earpiece 12B has a right earpiece housing 14B. A microphone 16A is shown on the left earpiece 12A and a microphone 16B is shown on the right earpiece 12B. The microphones 16A and 16B may be positioned to receive ambient sounds. Additional microphones may also be present. Speakers 22A and 22B are configured to communicate modified sounds 46A and 46B after processing, the modified sounds including the added environmental sounds. The modified sounds 46A and 46B may be communicated to the user FIG. 3 illustrates a side view of the right earpiece 12B and its relationship to a user's ear. The right earpiece 12B may be configured to isolate the user's ear canal 48 from the environment so the user does not hear the environment directly but may hear a reproduction of the environmental sounds as modified by the earpiece 12B which is directed towards the tympanic membrane 50 of the user. There is a gesture control interface 20 shown on the exterior of the earpiece. FIG. 4 is a block diagram of an earpiece 12 having an earpiece housing 14, and a plurality of sensors 24 operatively connected to one or more processors 18. The one or more sensors may include one or more bone microphones 32 which may be used for detecting speech of a user. The sensors 24 may further include one or more biometric sensors 34 which may be used for monitoring physiological conditions of a user. The sensors 24 may include one or more microphones 16 which may be used for detecting sound within the ambient environment of the user. The sensors 24 may include one or more inertial sensors 36 which may be used for determining movement of the user such as head motion of the user which may provide user input. A gesture control interface 20 is also operatively connected to the one or more processors 18. The gesture control interface 20 may be implemented in various ways including through capacitive touch or through optical sensing. The gesture control interface 20 may include one or more emitters 42 and one or more detectors 44. Thus, for example, in one embodiment, light may be emitted at the one or more emitters 42 and detected at the one or more detectors 44 and interpreted to indicate one or more gestures being performed by a user. One or more speakers 22 are also operatively connected to the processor 18. A radio transceiver 26 may be operatively connected to the one or more processors 18. The radio transceiver may be a BLUETOOTH transceiver, a BLE transceiver, a Wi-Fi transceiver, or other type of radio transceiver. A transceiver 28 may also be present. The transceiver 28 may be a magnetic induction transceiver such as a near field magnetic induction (NFMI) transceiver. Where multiple earpieces are present, the transceiver 28 may be used to communicate between the left and the right earpieces. A memory 37 is operatively connected to the processor and may be used to store instructions regarding sound processing, user settings regarding selections, or other information. The memory 37 may be a machine readable non-transitory memory and one or more additional ambient sounds may be stored on the memory 37 which may then be mixed in with the ambient environment sound. The memory 37 may also store settings regarding how the additional ambient sounds are to be mixed in. These settings may include such features as the volume or intensity to use for the additional ambient sounds or other such settings. One or more LEDs 38 may also be operatively connected to the one or more processors 18 and may be used to provide visual feedback regarding operations of the wireless earpiece.

Figure 5:
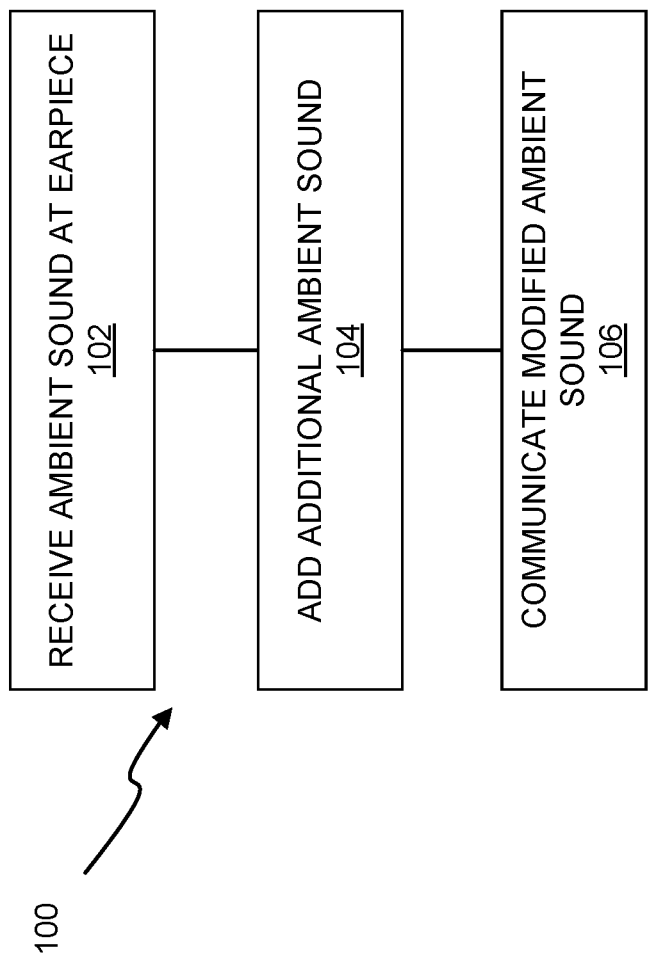
FIG. 5 includes a flowchart of one implementation of the method of adding an ambient environment at an earpiece.

FIG. 5 illustrates a flowchart of one embodiment of a method 100 of adding an ambient environment sound. In step 102, ambient sound is received at the earpiece. One or more microphones of the earpiece may be used to detect the ambient sound. It is also to be understood there may be a set of wireless earpieces present including a left earpiece and a right earpiece and each earpiece may have one or more microphones. In step 104, the ambient sound is processed to mix in additional sound selected by the user. The additional sound selected by the user may be of any number of types. It may be ambient sound of a type which the user may find soothing or relaxing such as waves at a beach, waterfalls, or similar natural sounds. It may be white noise if the user finds it helpful to drown out the other ambient noise. It may be the sound of a busy street, or any other type of ambient environment the user wishes to add. It should be understood, although sound is added, the original ambient sound is still present although it may be processed to a modified form. Thus, the user may still hear various sound sources within the user's environment. In one embodiment, the additional ambient sounds may be stored as one or more sound files on the wireless earpiece and the processor may use a mixing function to mix the additional ambient sounds with the detected ambient sounds. In some instances, the additional ambient sounds may be generated by the processor instead of being stored. The user may select the additional ambient sounds in any number of ways. For example, voice commands such as may be detected using one or more bone conduction microphones may instruct the earpiece as to which ambient sound(s) to add. The gestural control interface may be used to instruct the earpiece as to which ambient sound(s) to add. Where the earpiece includes a wireless transceiver, the earpiece may be in operative communication with other devices such as with a mobile device and the user may use the mobile device to instruct the earpiece which ambient sounds to add.

In step 106, the modified ambient sound which includes the ambient sound detected as well as the additional ambient sound is communicated to one or more speakers in order to transduce or produce the modified ambient sound. Thus, the user hears the modified ambient sound. It is to be understood the processor may provide for generating 3D sound, so a user perceives sounds as being from a 3D environment. The added ambient sound may be reproduced as 3D sound.

Therefore, various methods, systems, and apparatus have been shown and described. Although various embodiments or examples have been set forth herein, it is to be understood the present invention contemplates numerous options, variations, and alternatives as may be appropriate in an application or environment.

What is claimed is:

1. A set of wireless earpieces having a left earpiece and a right earpiece, comprising:
   each of the left earpiece and the right earpiece comprising:
      an earpiece housing configured to substantially encompass an opening of an ear canal to physically block ambient sound from entering the ear canal;
      a processor disposed within the earpiece housing;
      a transceiver operatively connected to the processor;
      a memory operatively connected to the processor, wherein an additional ambient sound is stored on the memory;
      a plurality of microphones operatively connected to the processor and configured to sense the ambient sound; and
      a speaker operatively connected to the processor;
   wherein the transceiver of the left earpiece is configured to communicate with the transceiver of the right earpiece; and
   wherein the processor of the left earpiece is configured to process the ambient sound from the plurality of microphones of the left earpiece and add the additional ambient sound stored in the memory of the left earpiece to produce a first modified ambient sound at the speaker of the left earpiece and the processor of the right earpiece is configured to process the ambient sound from the plurality of microphones of the right earpiece and add the additional ambient sound stored in the memory of the right earpiece to produce a second modified ambient sound at the speaker of the right earpiece.

2. The set of wireless earpieces of claim 1, further comprising a wireless transceiver disposed within the earpiece housing of the left earpiece and operatively connected to the processor of the left earpiece and a wireless transceiver disposed within the earpiece housing of the right earpiece and operatively connected to the processor of the right earpiece.

3. The set of wireless earpieces of claim 2, further comprising a gestural interface operatively connected to the processor of the left earpiece and a gestural interface operatively connected to the processor of the right earpiece, wherein the processor of the left earpiece is configured to receive a selection of the additional ambient sound stored in the memory of the left earpiece through the gestural interface of the left earpiece and the processor of the right earpiece is configured to receive a selection of the additional ambient sound stored in the memory of the right earpiece through the gesture interface of the right earpiece.

4. The set of wireless earpieces of claim 3, further comprising a 9-axis inertial sensor disposed within the earpiece housing of the left earpiece and operatively connected to the processor of the left earpiece and a 9-axis inertial sensor disposed within the earpiece housing of the right earpiece and operatively connected to the processor of the right earpiece.

5. The set of wireless earpieces of claim 1, wherein the left earpiece further comprises a bone conduction microphone configured to receive voice commands for adding the ambient environment sound stored in the memory of the left earpiece and the right earpiece further comprises a bone conduction microphone configured to receive the voice commands for adding the ambient environment stored in the memory of the right earpiece.

6. The set of wireless earpieces of claim 3 wherein the gesture interface of the left earpiece is a capacitive touch interface and the gesture interface of the right earpiece is a capacitive touch interface.

7. A method of adding an ambient environment sound to sound reproduced with a pair of wireless earpieces having a left earpiece and a right earpiece, the method comprising:
   receiving the ambient environment sound at a microphone of the left earpiece;
   receiving the ambient environment sound at a microphone of the right earpiece;
   receiving a voice command from a user to add one or more additional ambient sounds to the ambient environment sound;
   processing the ambient environment sound from the microphone of the left earpiece at a processor of at least one of the left earpiece and the right earpiece to add the one or more additional ambient sounds to the ambient environment sound to produce a first modified ambient environment sound at the left earpiece and processing the ambient environment sound from the microphone of the right earpiece at a processor of at least one of the right earpiece and the left earpiece to add the one or more additional ambient sounds to the ambient environment sound from the microphone of the right earpiece to produce a second modified ambient environment sound at the right earpiece;

communicating the first modified ambient environment sound from the processor of at least one of the left earpiece and the right earpiece to a speaker of the left earpiece and communicating the second modified ambient environment sound from the processor of at least one of the right earpiece and the left earpiece to a speaker of the right earpiece; and producing the first modified ambient environment sound at the speaker of the left earpiece and producing the second modified ambient environment sound at the speaker of the right earpiece.

8. The method of claim 7 wherein the voice command is received at a bone conduction microphone of at least one of the left earpiece and the right earpiece.

\* \* \* \* \*